(12) United States Patent
Byrne

(10) Patent No.: US 8,960,578 B2
(45) Date of Patent: Feb. 24, 2015

(54) HIGH IMPACT PRESSURE PROCESSOR

(76) Inventor: Warren Shawn Byrne, San Marcos, CA (US)

( * ) Notice: Subject to any disclaimer, the term of this patent is extended or adjusted under 35 U.S.C. 154(b) by 516 days.

(21) Appl. No.: 13/331,883

(22) Filed: Dec. 20, 2011

(65) Prior Publication Data

US 2012/0153059 A1 Jun. 21, 2012

Related U.S. Application Data

(60) Provisional application No. 61/424,820, filed on Dec. 20, 2010.

(51) Int. Cl.
*B02C 18/12* (2006.01)
*A47J 43/046* (2006.01)

(52) U.S. Cl.
CPC ..................................... *A47J 43/046* (2013.01)
USPC .......... 241/57; 241/282.1; 366/102; 366/249; 366/341

(58) Field of Classification Search
USPC .............. 241/57, 282.1, 282.2; 366/101, 102, 366/247–251, 341
See application file for complete search history.

(56) References Cited

U.S. PATENT DOCUMENTS 5,129,591 A * 7/1992 Sundquist ................... 241/282.2
5,580,007 A * 12/1996 Caviezel et al. ......... 241/199.12

FOREIGN PATENT DOCUMENTS

JP          10291191 A * 11/1998

* cited by examiner

*Primary Examiner* — Mark Rosenbaum

(57) ABSTRACT

A high impact pressure processor comprises of a piston. The piston comprises of a piston seal, a piston cap, a piston shaft, and a plurality of vent holes. The piston seal, located at an end of the piston shaft, seals out air from a container of a food processor or blender. This enables high impact pressure to be placed on the ingredient(s) in the container, thus creating smoother and thicker mixtures of ingredient(s). The plurality of vent holes allows air into container when needed, but are easily sealed off with the piston cap.

8 Claims, 4 Drawing Sheets

US 8,960,578 B2

HIGH IMPACT PRESSURE PROCESSOR

The current application claims a priority to the U.S. Provisional Patent application Ser. No. 61/424,820 filed on Dec. 20, 2010.

FIELD OF THE INVENTION

The present invention relates generally to kitchen appliances for processing ingredient(s). Specifically, the present invention relates to a device for creating high impact pressure blending of foods.

BACKGROUND OF THE INVENTION

Current food processors and blenders, while efficient for roughly chopping and blending ingredient(s) together, does not allow for more concentrated mixtures of ingredient(s). The present invention is able to create a tight seal around the ingredient(s), effectively sealing out any exposure the ingredient(s) have to air. The lack of air in the food processing appliance, which is often a food processor or a blender, will create more emulsified and concentrated mixtures while processing and blending ingredient(s). In traditional food processing devices, there is a continuous air exposure to the ingredient(s) while in the storage container, even with a lid placed on said container. Therefore, while using the appliance, air is continuously being incorporated into the ingredient(s) mixture. For many recipes, air is required to make a mixture with whipped-like in consistency, so ordinary food processors and blenders work well. However, for many other recipes, it is not required to add air, which can often detract from the intense flavors of the ingredient(s).

DETAIL DESCRIPTIONS OF THE INVENTION

Figure 1:
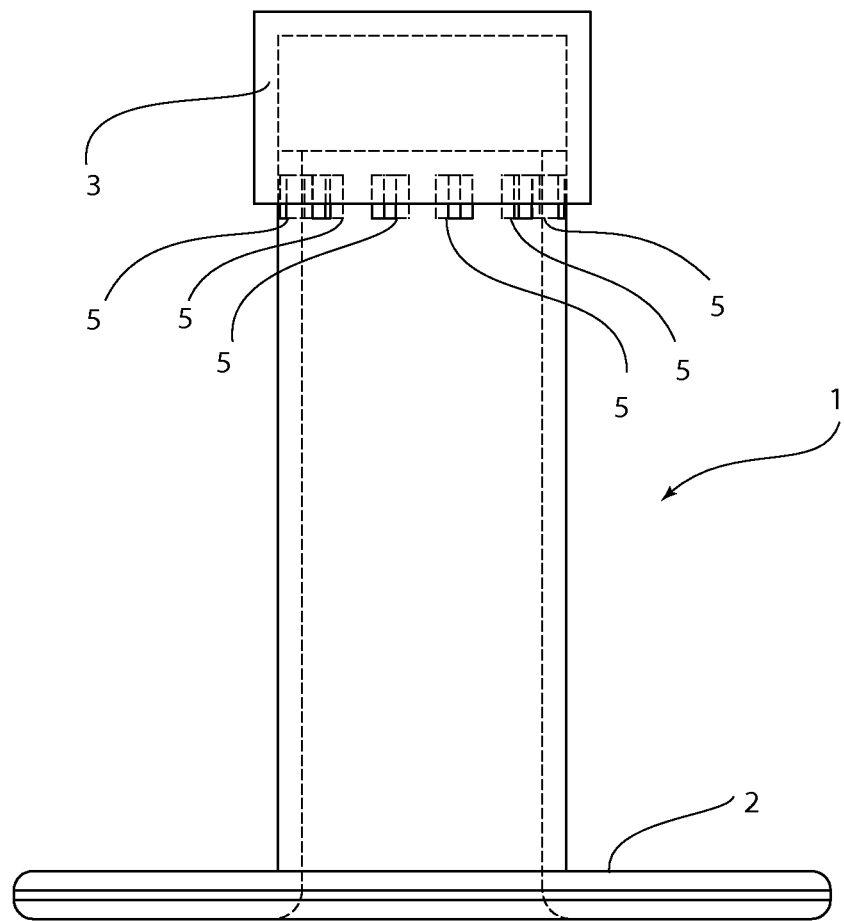
FIG. 1 is a front plan view of the present invention.

All illustrations of the drawings are for the purpose of describing selected versions of the present invention and are not intended to limit the scope of the present invention.

In reference to FIG. 1, FIG. 2, FIG. 3, and FIG. 4, a high impact pressure processor, herein referred to as the processor, is a food processing appliance 10, such as, but not limited to, a food processor and or a blender. The present invention still makes use of processor components such as a container 6 and a rotating blade 7. The present invention is food processor with a piston 1 that seals against the inside wall(s) of the container 6 and around the blade 7. The piston 1 exerts downward pressure on the ingredient as it is being reduced and consists of a piston seal 2, a piston cap 3, and a piston shaft 4. The piston seal 2, in the present embodiment, is made of a thin rubber so that as it moves down the container 6 and on top of the ingredient(s), air 8 is expelled until the piston seal 2 is in direct contact with the ingredient(s). This occurs because of the interaction between the rubber material and the typical plastic material of the container 6 in a food processor or the typical glass material of the container 6 in a blender. At this time the ingredient(s), no matter which physical state (liquid or solid) it is in, is not able to move past the seal 2. A light downward pressure is applied to the piston shaft 4 throughout the duration of the process. The pressure ensures greater food processing without the presence of air 8.

Figure 2:
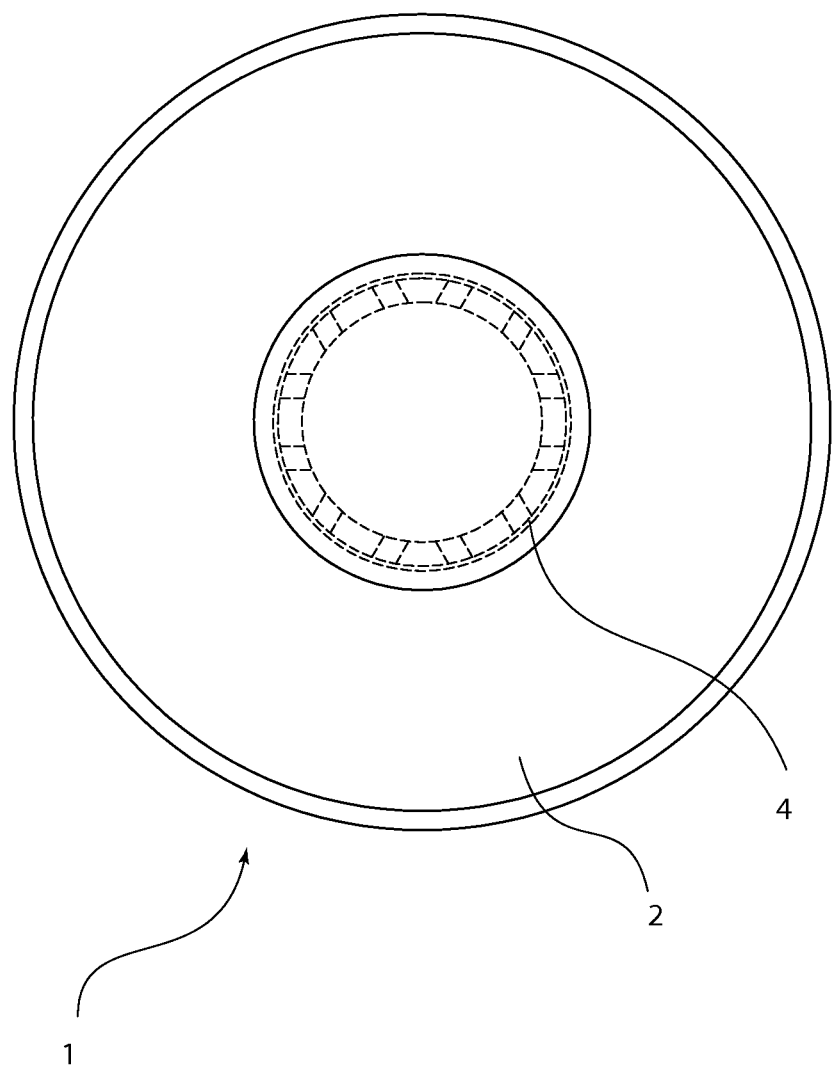
FIG. 2 is a bottom view of the present invention.
Figure 4:
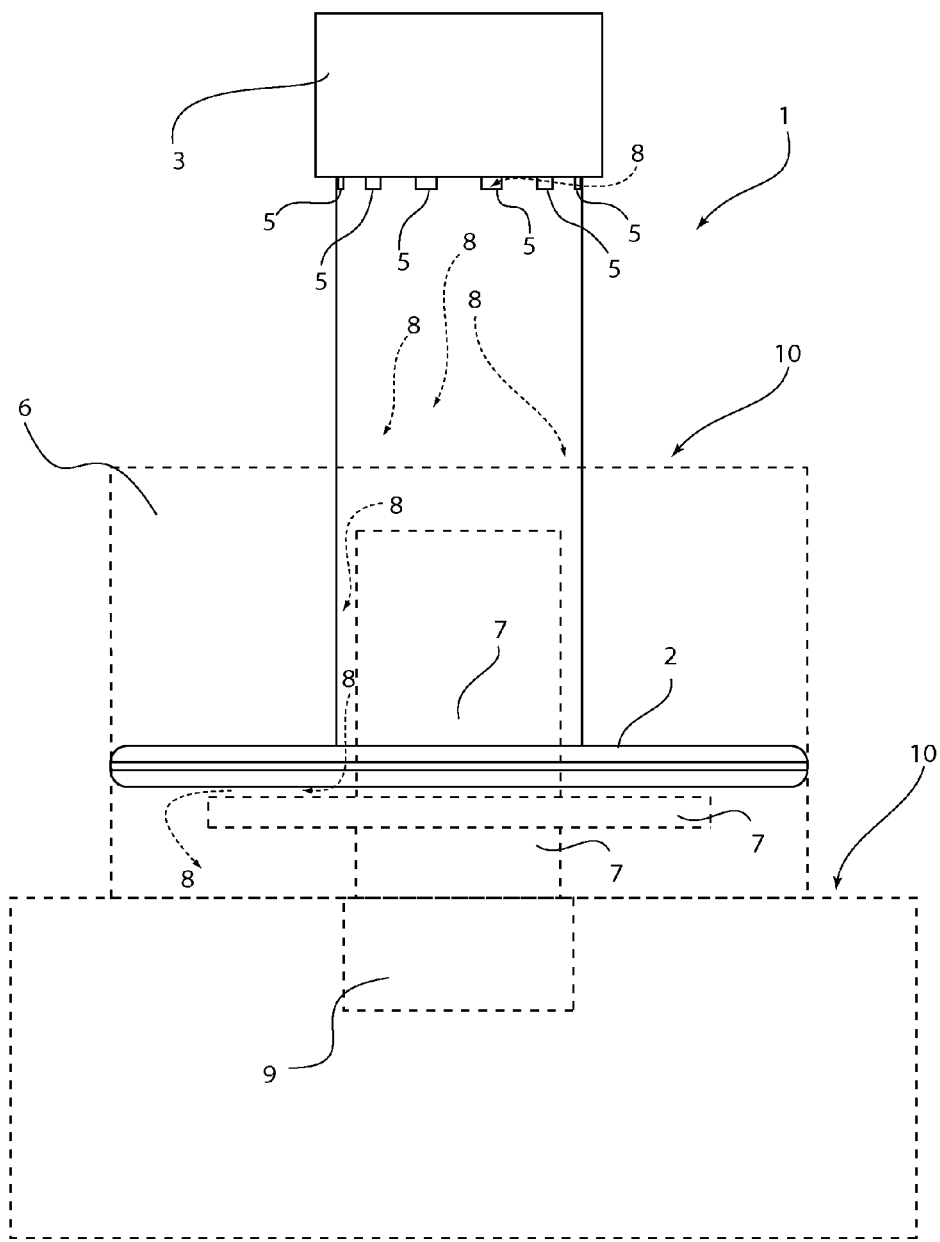
FIG. 4 is a view of the present invention in its environment showing the flow of air throughout the present invention and the environment.

In reference to FIG. 1, FIG. 2, and FIG. 4, the processor is namely activated by applying a slight downward pressure on the cap 3 and the shaft 4, which causes the shaft 4 to move closer to the blade 7 and the ingredient(s) in the container 6. It takes only slight pressure from the piston 1 and the removal of air 8 to create very large increases in the impact pressures of the blade 7 and the ingredient. The impact pressures are determined by the speed of the blade 7 and the inertia of the food particle being struck. A related example would be to take a baseball and place it on a tee ball stand. The baseball can be hit with a bat and set in motion without needing a great impact from the bat. If for instance, a sack of 30 baseballs were placed on the same stand and the bat was swung at the same speed as the previous example, the impact pressure would be much greater. This is due to the fact that there are more baseballs that the bat must hit after it swings and as a result, there is more pressure being placed on the movement of the bat. This same principal is at work on the blade 7 when using the processor. The ingredient(s) in the container 6 becomes one mass of dense material without the ability to move freely, similar to the sack of 30 baseballs. The second similarity is the trapping effect, where the piston 1 traps the ingredient(s) and forces it to come into contact with the blade 7. In relation to the sack of baseballs, the sack traps the 30 baseballs within it, forcing the bat to come into contact with all 30 baseballs. This allows for blending and processing at any blade speed and any viscosity of substance without the presence of air 8.

Referring to FIG. 4, existing processors require that the viscosity of the ingredient(s) and blade speed be in balance in order to have the ingredient(s) fall back on the blade 7 for a continuous movement away from and toward the blade 7. This creates a traditional vortex pattern that is present in processors and blenders. While the vortex pattern has proven to be useful in its function thus far for blending and processing an ingredient(s), it still manages to restrict the chemistry of processing by incorporating extra air 8 into the ingredient(s) mixture. Also, this type of mixing forces the addition of unwanted thinning of the ingredient(s). Current food processors and blenders most always add in air 8 into the ingredient(s) causing a diluting effect to the flavor and changing the chemistry of the material. Processing in a hermetic environment, an environment with no exposure to air 8 has a reduction effect on the ingredient(s), thus intensifying the flavor of the ingredient(s). Also, the processor will remove any diluting effect that tends to occur without the present invention. This process allows for greater emulsification under pressure and allows the processing to operate without the presence of air 8. The present invention traps the material and forces it to come into contact with the blade 7.

Again referring to FIG. 4, one example of hermetic blending is custard, which can be made in a food processor with the processor by adding cooked eggs, sugar, vanilla and powdered milk and process for a few seconds. The result is rich, thick custard that has little to no movement. This mixture would simply not mix in existing processors because it is inconsistent and solid in texture, and would therefore begin to disperse against the walls and lids of the container 6 instead of mixing together. In traditional processors the mixture of the different ingredient(s) with varying viscosities and textures would never blend into a mixture that was smooth, which is necessary for creating custard. This is due in part to the fact that the traditional food processing appliance 10 lacks ability to create the pressure needed to finely reduce a substance. The different textures of the different ingredient(s) require high pressure to reduce and breakdown the state of the ingredients to a much finer consistency. Even, if the ingredient(s) were able to blend into a smooth mixture, the presence of air 8 alone would destroy the custard's viscosity because in the midst of blending, air 8 would continuously be incorporated into the mixture. Then, the custard would proceed to turn into an airy mousse instead of maintaining a thick pudding-like consistency.

In reference to FIG. 4, some recipes that can be created with the processor include pâté and other similar high viscosity substances such as cheese mixtures, which can be broken down to a very fine texture without introducing air 8. Fruit and vegetable puree can also be made using ingredients that are often tougher to chop such as beets, sweet potatoes, carrots. Other examples include making thick, rich, and smooth butters out of nuts in a very short amount of time. High impact pressure placed on blade 7 and the nuts while processing, allowing for finer chopped and blended ingredient(s). The impact pressure is able to breakdown the ingredient(s) enough to where they will then recombine into a new mixture. The quicker the blade speed combined with the ability to finely chop, will cause the ingredient(s) to begin to form a paste-like consistency. Depending on the ingredient(s) and amount of time spent on blending, the paste-like consistency can easily turn into a more soft mixture, such as one with a peanut butter-like consistency. Other functions which can be improved by the use of the processor is making baby food with various desired viscosity in seconds, thus removing the need for thickeners and other ingredient(s) that can interfere with the flavor and quality of fresh vegetables and fruits. Another example includes creating rich sauces and gravies (especially those using a flour or starch roux). These recipes can be processed further than simmering on a stove top without the need to introduce air 8. The present invention can help to create more concentrated sauces and gravies because of the lack of air from the pressure processing. Also, candies such as chocolate, icing, and fudge can be processed to a finer, creamier texture without melting or cooking, and without the introduction of air 8.

Referring to FIG. 4, although the processor increases the number of tasks the typical food processing appliance 10 can accomplish, it does not interfere with the more basic uses of these types of appliances. The processor still allows a user to chop raw fruits and vegetables to any desired consistency. Therefore, essentially any type of consistency, texture, and viscosity can be achieved, from a coarse chop to a fine puree depending on the process time. Ice and frozen fruits or vegetables can be processed without the addition of liquid in a very short time allowing for very high viscosity finished products such as, but not limited to, smoothies. Also, jams and jellies can be made with dried fruit in minutes with no pectin and no set time, which helps to create fresher recipes and healthier foods. Oil and vinegar and or water can be emulsified with no agent and stay in suspension many hours for use in dressings or marinades. Although many examples are mentioned, the processor is not limited to these ingredient(s) and recipes. Any ingredient(s) at nearly any viscosity can be processed to a desired consistency and viscosity with this method.

Figure 3:
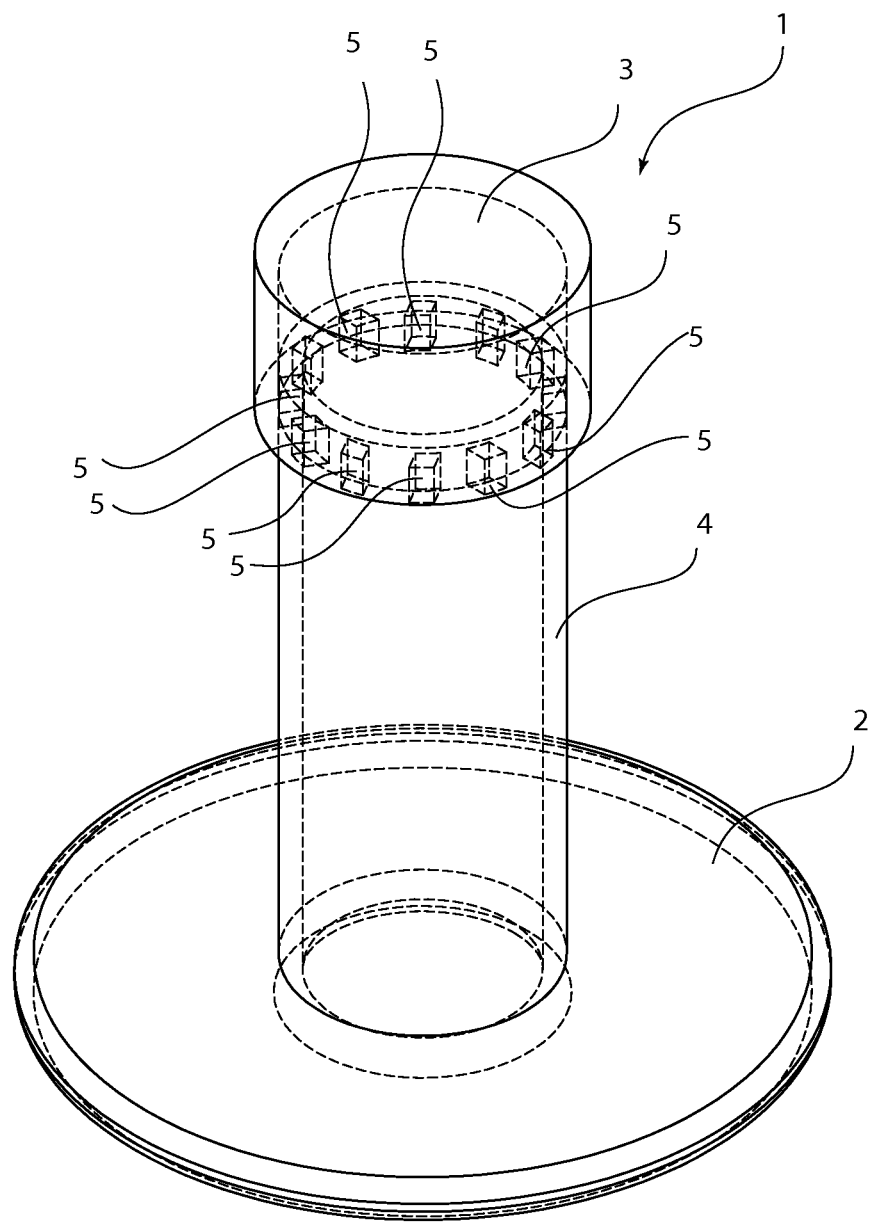
FIG. 3 is a perspective view of the present invention.

In reference to FIG. 1, FIG. 3, and FIG. 4, to ensure that the food processing appliance 10 can still create airy mixtures, there is a plurality of vent holes 5 on the piston shaft 4. While the food processor is in use and the piston shaft 4 is being slowly pushed into the food processor. The plurality of vent holes 5 are located at the top of the piston shaft 4 and is not covered. The piston 1 will come into contact with any foods or liquids to seal off the vent holes. The convenience of the piston cap 3 is that it can allow the user to add in air 8 or stop the incorporation of air 8 into the mixture whenever needed. By pumping the piston cap 3 up and down on the piston shaft 4, the user can let in air 8. The air 8 that will be let in from the vent holes 5 and travel down the shaft 4 and into the container 6 where the ingredient(s) mixture is located.

In reference to FIG. 4, the blades of the processor can be several different blades. However, in the preferred embodiment of the present invention, the blade has a profile that does not move materials as in a standard food processor. The rotating blade used can be flat horizontal blades that are able to process foods while creating minimal vertical pressure. In this embodiment of the present invention, a symmetrical profile on the blade surface will provide minimal vertical pressure while allowing the piston to amplify the processing power like a hydraulic cylinder. Furthermore, the sealed space of the processing ensures that the foods are properly and thoroughly emulsified or processed. The present invention further utilizes a powerful motor to ensure proper emulsification or processing of any foods.

The processor allows users to create and defy the ordinary rules of cooking. The present invention can rely on food processing chemistry to create a new wide range of food products that are created solely through high impact pressure created by the processor.

In reference to FIG. 3, for industrial purposes the present invention could use hydraulics to drive the piston 1 in order to achieve very high/low pressures at a wide range of viscosities with food and non food products. Once the piston 1 is in direct contact with the ingredient(s) the vent hole 5 is closed and further pressure can be applied, or the direction of the piston 1 could be reversed to create low pressure (vacuum) during processing. In the cases of emulsifying or homogenizing a mixture, which require a greater suspension, a high shear pump/mill could be used to circulate the material within the container 6. The fact that the material entering the high shear device would already be under pressure would either increase the ultimate shear pressures, or allow for the use of a high volume shear device with a lower compression ratio.

Although the invention has been explained in relation to its preferred embodiment, it is to be understood that many other possible modifications and variations can be made without departing from the spirit and scope of the invention as hereinafter claimed.

What is claimed is:

1. A high impact pressure processor comprises,
   a piston;
   a food processing appliance;
   the piston inserted into the food processing appliance;
   the piston sealed inside the food processing appliance;
   the piston comprises of a piston seal, a piston cap, a piston shaft, and a plurality of vent holes; and
   the food processing appliance comprises of a motor, a blade, and a container.

2. The high impact pressure processor as claimed in claim 1 comprises,
   the piston seal placed at one end of the piston shaft;
   the plurality of vent holes positioned on the piston shaft opposite of the piston seal;
   the plurality of vent holes traversing through the piston shaft;
   the piston cap positioned atop of the piston shaft opposite of the piston seal; and
   the plurality of vent holes covered by the piston cap.

3. The high impact pressure processor as claimed in claim 1 comprises,
- the blade concentrically inserted into the container;
- the motor connected to the blade; and
- the motor positioned below the container.

4. The high impact pressure processor as claimed in claim 1 comprises,
- the piston inserted into the container;
- the piston positioned above the blade;
- the piston seal concentrically placed in the container;
- the piston seal sealed to the container; and
- the piston shaft enclosing the blade.

5. A high impact pressure processor comprises of,
- a piston;
- a food processing appliance;
- wherein the food processing appliance is a food processor or a blender;
- the piston inserted into the food processing appliance;
- the piston sealed inside the food processing appliance;
- the piston comprises of a piston seal, a piston cap, a piston shaft, and a plurality of vent holes; and
- the food processing appliance comprises of a motor, a blade, and a container.

6. The high impact pressure processor as claimed in claim 5 comprises,
- the piston seal placed at one end of the piston shaft;
- the plurality of vent holes positioned on the piston shaft opposite of the piston seal;
- the plurality of vent holes traversing through the piston shaft;
- the piston cap positioned atop of the piston shaft opposite of the piston seal;
- the plurality of vent holes covered by the piston cap;
- the blade concentrically inserted into the container;
- the motor connected to the blade; and
- the motor positioned below the container.

7. The high impact pressure processor as claimed in claim 5 comprises,
- the piston inserted into the container;
- the piston positioned above the blade;
- the piston seal concentrically placed in the container;
- the piston seal sealed to the container; and
- the piston shaft enclosing the blade.

8. A high impact pressure processor comprises of,
- a piston;
- a food processing appliance;
- wherein the food processing appliance is a food processor or a blender;
- the piston inserted into the food processing appliance;
- the piston sealed inside the food processing appliance;
- the piston comprises of a piston seal, a piston cap, a piston shaft, and a plurality of vent holes;
- the food processing appliance comprises of a motor, a blade, and a container;
- the piston seal placed at one end of the piston shaft;
- the plurality of vent holes positioned on the piston shaft opposite of the piston seal;
- the plurality of vent holes traversing through the piston shaft;
- the piston cap positioned atop of the piston shaft opposite of the piston seal;
- the plurality of vent holes covered by the piston cap;
- the blade concentrically inserted into the container;
- the motor connected to the blade;
- the motor positioned below the container;
- the piston inserted into the container;
- the piston positioned above the blade;
- the piston seal concentrically placed in the container;
- the piston seal sealed to the container; and
- the piston shaft enclosing the blade.

\* \* \* \* \*